United States Patent [19]
Powell

[11] Patent Number: 5,991,617
[45] Date of Patent: *Nov. 23, 1999

[54] METHOD FOR PREVENTING CELLULAR TELEPHONE FRAUD

[75] Inventor: Michael B. Powell, Tucson, Ariz.

[73] Assignee: Authentix Network, Inc., Tucson, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 08/625,738

[22] Filed: Mar. 29, 1996

[51] Int. Cl.$^6$ ...................................................... H04Q 7/38
[52] U.S. Cl. ......................... 455/410; 455/411; 455/403; 455/432
[58] Field of Search .................. 455/410, 411, 455/432, 433, 403; 380/23; 340/825.3, 825.31, 825.34, 825.5; 395/186, 187.01, 188.01; 379/91.01, 91.02

[56] References Cited

U.S. PATENT DOCUMENTS

| | | | |
|---|---|---|---|
| 5,309,501 | 5/1994 | Kozik et al. | 455/410 |
| 5,335,265 | 8/1994 | Cooper et al. | 455/410 |
| 5,335,278 | 8/1994 | Matchett et al. | 455/410 |
| 5,457,737 | 10/1995 | Wen | 455/410 |
| 5,465,387 | 11/1995 | Mukherjee | 455/410 |
| 5,497,412 | 3/1996 | Lannen et al. | |
| 5,541,977 | 7/1996 | Hodges et al. | 455/411 |
| 5,588,042 | 12/1996 | Comer | 455/433 |
| 5,633,914 | 5/1997 | Rosa | 455/411 |
| 5,668,875 | 9/1997 | Brown et al. | 455/411 |
| 5,668,876 | 9/1997 | Falk et al. | 455/411 |
| 5,777,558 | 7/1998 | Pennypacker et al. | 455/410 |
| 5,805,674 | 9/1998 | Anderson, Jr. | 455/410 |

*Primary Examiner*—Wellington Chin
*Assistant Examiner*—Keith Ferguson
*Attorney, Agent, or Firm*—William S. Galliani; Pennie & Edmonds LLP

[57] ABSTRACT

A method of identifying the fraudulent use of a cellular telephone includes the step of identifying an initial call made from the cellular telephone. An automated challenge-response authentication operation is then executed with a rotating subscriber query, resulting in a first authentication failure. In response to the first authentication failure, an operator assisted escalated challenge-response authentication operation is performed with a rotating subscriber query to generate a second authentication failure, indicating the fraudulent use of the cellular telephone.

9 Claims, 3 Drawing Sheets

METHOD FOR PREVENTING CELLULAR TELEPHONE FRAUD

BRIEF DESCRIPTION OF THE INVENTION

This invention relates generally to cellular telephones. More particularly, this invention relates to the prevention of the unauthorized use of cellular telephones through a challenge-response authentication operation.

BACKGROUND OF THE INVENTION

The use of stolen Mobile Identification Numbers (MINs) and Electronic Serial Numbers (ESNs) to fraudulently place wireless telephone calls is causing the cellular telephone industry losses of hundreds of millions of dollars a year. As the cellular telephone industry continues to rapidly expand, the fraud losses continue to grow. A major portion of these losses are attributed to "roaming" fraud. Roaming fraud is largely a result of the creation of "cloned MINs/ESNs" taken from legitimate cellular telephone customers in a home region. These cloned numbers from the home region are programmed into modified cellular telephones for use in a roaming region outside of the home region.

When a cloned MIN/ESN cellular telephone registers in a roaming region, the carrier of the roaming region requests the registration data for that MIN/ESN from the carrier in the home region. This registration data is delivered back to the roaming region, allowing the roaming region to provide service, if appropriate. Thus, the system validates that a MIN/ESN is entitled to cellular service in a roaming region, but it does not determine whether the telephone itself is in fact legitimate and not just a clone of the true telephone.

In view of the foregoing, it would be highly desirable to provide a method and apparatus for authenticating that a validated MIN/ESN is being utilized by a legitimate subscriber, not a criminal that has stolen a legitimate subscriber's MIN/ESN.

SUMMARY OF THE INVENTION

The invention is a method of identifying the fraudulent use of a cellular telephone. The method includes the step of identifying an initial call made from the cellular telephone. Typically, the call is made from a roaming region outside of a home region. An automated challenge-response authentication operation is then executed with a rotating subscriber query, resulting in a first authentication failure. In response to the first authentication failure, an operator assisted escalated challenge-response authentication operation is performed with a rotating subscriber query to generate a second authentication failure, indicating the fraudulent use of the cellular telephone.

The method of the invention provides a convenient technique for authenticating the use of a cellular telephone. Thus, with minimal inconvenience to cellular telephone customers, the cellular telephone industry can reduce hundreds of millions of dollars in annual losses stemming from cellular telephone fraud. Advantageously, the method can be implemented in existing telephone infrastructures. Thus, existing cellular telephones do not have to be modified and large cellular telephone infrastructure expenses are not necessary. Another advantage of the system is that it operates independently of different cellular service providers in different regions, this independence eliminates potential conflicts between cellular service providers over the accessibility of customer information.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
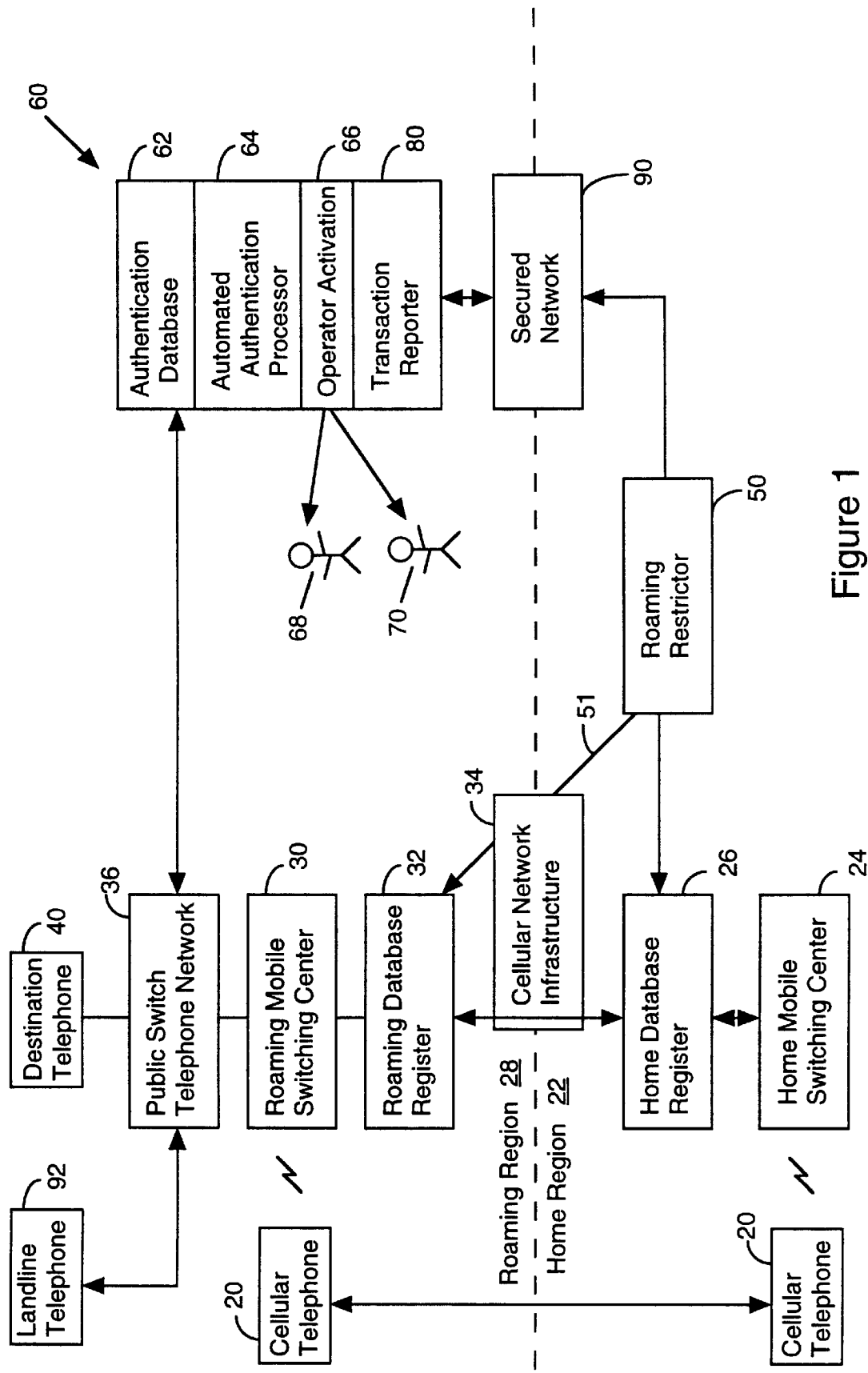
FIG. 1 illustrates a system incorporating the technology of the present invention.

FIG. 1 illustrates an apparatus that may be used in accordance with the present invention. A cellular telephone 20 is used in a home region 22 in a standard manner to access a home mobile switching center 24 (sometimes referred to as a "home carrier" or "mobile switching center"). The home mobile switching center 24 interacts with a home database register 26 (sometimes referred to as a "home location register"). The home database register 26 is a database that contains cellular telephone subscriber information, such as a Mobile Identification Number (MIN) and an Electronic Serial Number (ESN). The interaction between a cellular telephone 20, a home mobile switching center 24, and a home database register 26 is known in the art.

The user of a cellular telephone 20 may roam from a home region 22 to a roaming region 28. When the user of the cellular telephone attempts to make a call from the roaming region 28, a connection is made to a roaming mobile switching center 30, using techniques known in the art. As known in the art, the roaming mobile switching center 30 interacts with a roaming database register 32, which in turn interacts with a cellular network infrastructure 34 to access the home database register 26. The home database register 26 passes cellular telephone subscriber information to the cellular network infrastructure 34, which conveys it to the roaming database register 32.

The roaming mobile switching center 30 is allowed to connect the cellular telephone 20 to the public switch telephone network 36, and ultimately a destination telephone 40, if the appropriate cellular telephone subscriber information is received by the roaming database register 32 from the home database register 26. In other words, if "validated information" is received at the roaming database register 32, then the cellular telephone call is completed. The validated information is limited to information such as the Mobile Identification Number (MIN) or the Electronic Serial Number (ESN) of the cellular telephone 20. Thus, the system validates that a MIN/ESN is entitled to cellular telephone service in a roaming region. On the other hand, it is unknown whether the cellular telephone 20 itself is in fact legitimate and not just a clone of the true telephone.

The present invention is directed toward solving this limitation associated with prior art telephone systems. In addition to relying upon the known validation operation described above, the invention provides for an additional "authentication operation". That is, the present invention "authenticates" that the person using the cellular telephone 20 is authorized to do so. The authentication operation may be executed in a number of ways. FIG. 1 illustrates that the authentication operation may be implemented with a roaming restrictor 50 operating in connection with an authentication computer 60, and a secured network 90.

The roaming restrictor 50 is a computer that monitors the information that is sent by the home database register 26 to the roaming database register 32. More particularly, the roaming restrictor 50 monitors whether information about a system subscriber is passed from the home database register 26 to the roaming database register 32. Thus, if a system subscriber using a cellular telephone 20 moves from a home region 22 to a roaming region 28 and then attempts to make a call from the roaming region 28, the standard cellular operations of passing validation information from the home database register 26 to the roaming database register 32 over the cellular network infrastructure 34 is performed.

The roaming restrictor 50 identifies when information regarding a specified individual, the system subscriber, is passed. If information regarding a system subscriber is passed, then an authentication demand is sent to the roaming mobile switching center 30. That is, a signal is sent over link 52 through the cellular network infrastructure 34, advising the roaming database register 32 not to connect the cellular telephone call until an authentication operation is completed for the system subscriber. Thus, in accordance with the invention, the normal processing of a cellular telephone call is halted until an authentication operation is completed. The connection of the cellular telephone call to a specified destination telephone 40 may be prevented with an instruction to the roaming mobile switching center 30 or an instruction to the cellular network infrastructure 34.

The authentication demand results in the roaming mobile switching center 30 contacting the authentication computer 60, typically through the public switch telephone network 36. Preferably, this connection to the authentication computer 60 is automatic and transparent to the cellular telephone 20 user. In other words, the initial call by the user of the cellular telephone 20 is intercepted by the roaming restrictor 50, resulting in a call forwarding operation to the authentication computer 60.

Preferably, the authentication demand is simultaneously sent over a secured network 90 to the authentication computer 60, prompting the authentication computer 60 to expect an authentication operation.

The authentication operation executed by the authentication computer 60 may be performed in a number of ways. Similarly, the authentication computer 60 may be implemented in a number of ways. FIG. 1 illustrates an authentication computer 60 implemented with an authentication database 62, an automated authentication processor 64, an operator activation interface 66, and a transaction reporter 80.

The authentication database 62 stores authentication information on system subscribers. In general, the authentication information stored in the authentication database 62 is information that can only be provided by the subscriber, for example, a password, a digitally stored "voice print" (a recorded digital signal characterizing the voice of the system subscriber), social security number, driver's license number, and/or the maiden name of the system subscriber. The different information fields in the authentication database 62 are used to produce rotating subscriber queries, as will be discussed below.

The automated authentication processor 64 of the authentication computer 60 is used to execute a challenge-response authentication operation. The automated challenge-response authentication operation may be performed in any number of ways, including the machine recognition of a DTMF signal, speaker-independent word recognition, and speaker-dependent word recognition.

Thus, in a preferable embodiment of the invention, after an authentication demand has been generated and the system subscriber is connected to the authentication computer 60, a first challenge-response authentication operation is performed through an automated operation controlled by the automated authentication processor 64. The automated operation may be performed in any number of ways. For example, a machine recognition of a DTMF signal may be used. That is, an automated prompt may be enunciated to request information corresponding to information in the authentication database 62. For example, an automated prompt may be used to request the system subscriber's social security number. Thereafter, the number is entered by the system subscriber using the keys on the telephone. If the received DTMF tones of the entered number match those stored in the authentication database 62, then an authentication success exists, otherwise an authentication failure exists and a second challenge-response authentication operation is performed, as will be described below.

Speaker-independent word recognition may also be used for the first challenge-response authentication operation. With this approach, an automated word recognition system is used to ascertain whether the individual using the cellular telephone 20 correctly responds to a query derived from the subscriber information stored in the authentication database 62. For example, the user of the cellular telephone 20 may be asked "Please state your mother's maiden name." An automated word recognition program is then used to analyze whether the verbal response is consistent with the information in the authentication database 62.

The first challenge-response authentication operation may also be performed with an automated speaker-dependent word recognition system. In this case, a particular "voice print" is used to confirm that the user of the cellular telephone 20 is the authorized user.

If an authentication success is achieved during the automated first challenge-response operation, then the transaction reporter 80 records the data associated with the transaction. For example, the transaction reporter 80 stores information regarding the time of the call, from where the call was made, and/or what subscriber queries were used during the authentication operation. As indicated above, the subscriber queries are derived from the information in the authentication database 62. Preferably, the subscriber queries are rotating subscriber queries, meaning that each challenge-response authentication operation uses a new, preferably non-repeating, subscriber query derived from the authentication database 62. Accordingly, it is necessary for the transaction reporter 80 to record what was the last subscriber query so that a proper rotation of subscriber queries is used.

The successful authentication operation also results in the authentication computer 60 generating an authentication signal. The authentication signal is passed over the secured network 90, to the roaming restrictor 50, over the cellular network infrastructure 34, to the roaming database register 32, and to the roaming mobile switching center 30. The authentication signal is an enabling signal to the roaming mobile switching center 30. That is, the authentication signal enables the roaming mobile switching center 30 to process calls from the cellular telephone 20. Preferably, the authentication signal enables the roaming mobile switching center 30 to process calls for a predetermined period of time. Afterwards, a new authentication operation is required.

If an authentication failure is produced during the automated first challenge-response operation, an escalation to a second challenge-response authentication operation occurs. That is, if the automated authentication processor 64 produces an authentication failure, it invokes an operator activation interface 66. As its name implies, the operator activation interface 66 is used as an interface to one or more human operators 68 and 70. In a preferable system, a first operator 68 is used to view selected information from the authentication database 62. That is, the first operator 68 has access to certain information in the authentication database 62. The first operator 68 notes the last query to the individual using the cellular telephone 20 and then rotates to one or more queries to the individual. Alternatively, the authentication computer 60 may automatically show the operator 68 the next query. If the individual successfully responds to one or more queries, an authentication success exists, and the previously described processing steps are performed.

The system is preferably implemented with an authentication failure count. That is, a variable is used to count the number of authentication failures. The authentication failures are typically counted from both the automated first challenge-response authentication operation and the operator authentication second challenge-response authentication operation. The fraudulent use of the cellular telephone 20 is said to exist when the authentication failure count reaches a configurable predetermined number (typically in the range of 2–6).

Preferably, an operator supervisor 70 is invoked before a fraudulent cellular telephone use is declared. Preferably, the operator supervisor 70 has access to the complete set of information in the authentication database 62. The operator supervisor 70 uses the same technique of rotating subscriber queries in a challenge-response system. The operator supervisor 70 may select the queries or they may be automatically generated by the authentication computer 60.

When the authentication failure count reaches a predetermined value and the fraudulent use of the cellular telephone 20 is believed to exist, an authentication disable signal is sent by the authentication computer 60 to the secured network 90. The transaction reporter 80 records all information leading up to the sending of the authentication disable signal. The authentication disable signal is routed by the secured network 80 to the roaming restrictor 50, through the cellular network infrastructure 34, to the roaming database register 32, and ultimately to the roaming mobile switching center 30, which responds by cutting-off service to the cellular telephone 20. Typically, the cellular service is cut-off for a predetermined period of time. During this time period, if the user of the cellular telephone 20 attempts to make another call, the roaming restrictor 50 will identify an access by the user to the home database register 26. The roaming restrictor 50 then notes the previous authentication failure for this user and therefore sends a message over the cellular network infrastructure 34 to prevent the completion of the call. In an alternate embodiment, the authentication disable signal causes the roaming mobile switching center 30 to block service when a new call is attempted.

Figure 2:
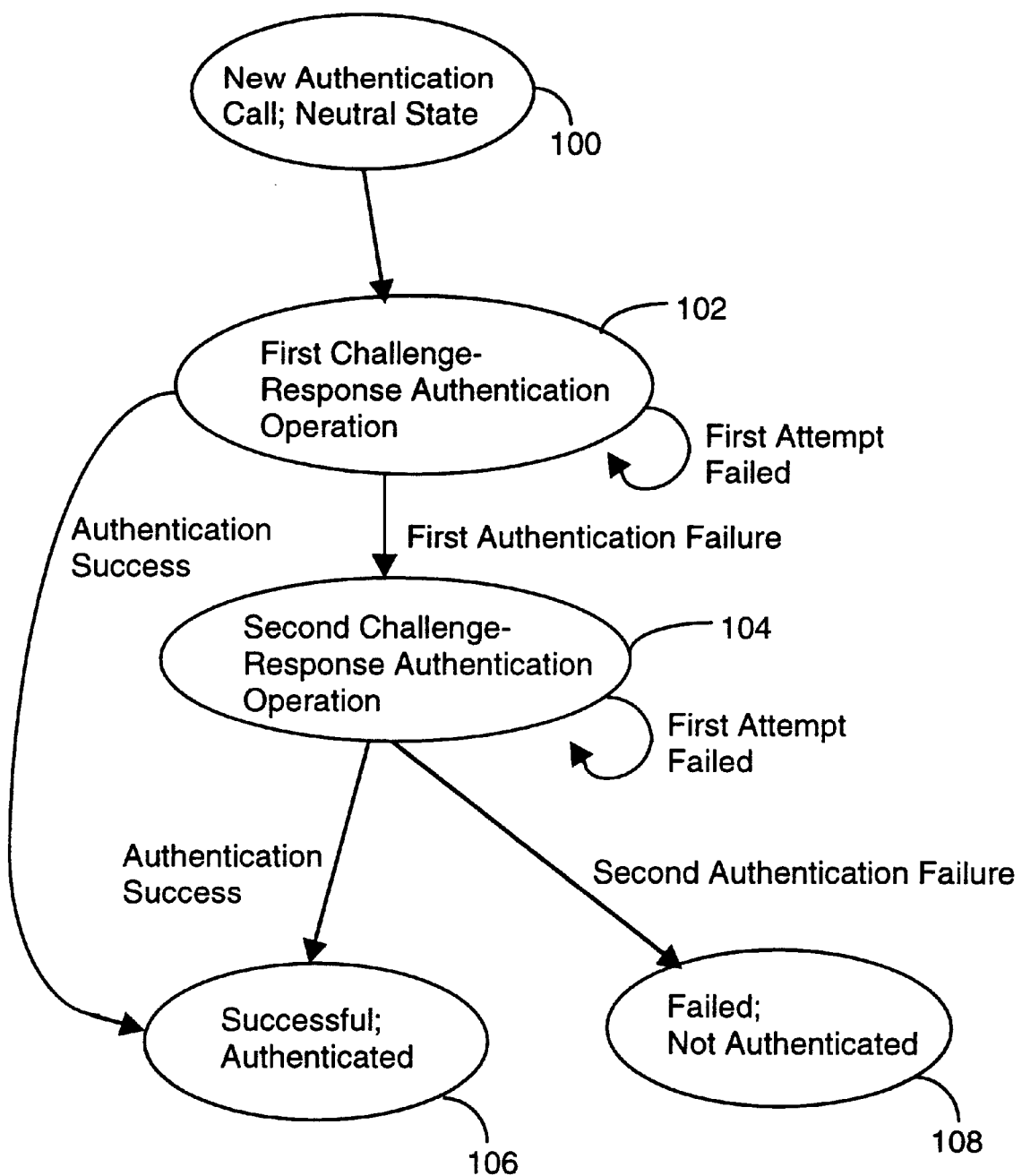
FIG. 2 is a state diagram illustrating the processing states associated with one embodiment of the invention.

The methodology of the invention will be more fully appreciated with reference to FIG. 2. FIG. 2 illustrates a state diagram associated with the processing of one embodiment of the invention.

The first operational state is a neutral state when the first call is made in a roaming region 28 (state 100). A first challenge-response operation is then performed (state 102). As indicated above, preferably, the first challenge-response operation is an automated operation. The first challenge-response operation may include a first failed attempt, as shown in FIG. 2. That is, the first challenge-response operation may include two (or more) rotating subscriber queries.

If the first challenge-response authentication operation is successful, control is passed to a successfully authenticated state (state 106), which results in the generation of the previously described authentication command.

If the first challenge-response authentication operation results in an authentication failure, a first authentication failure is said to exist and control proceeds to a second challenge-response authentication operation (state 104). As indicated above, the second challenge-response authentication operation preferably entails operator intervention. The second challenge-response authentication operation may include two (or more) subscriber queries. If the second challenge-response authentication operation is successful, the authenticated state (state 106) is reached, otherwise a second authentication failure is said to exist and an authentication failure state (state 108) is reached.

Figure 3:
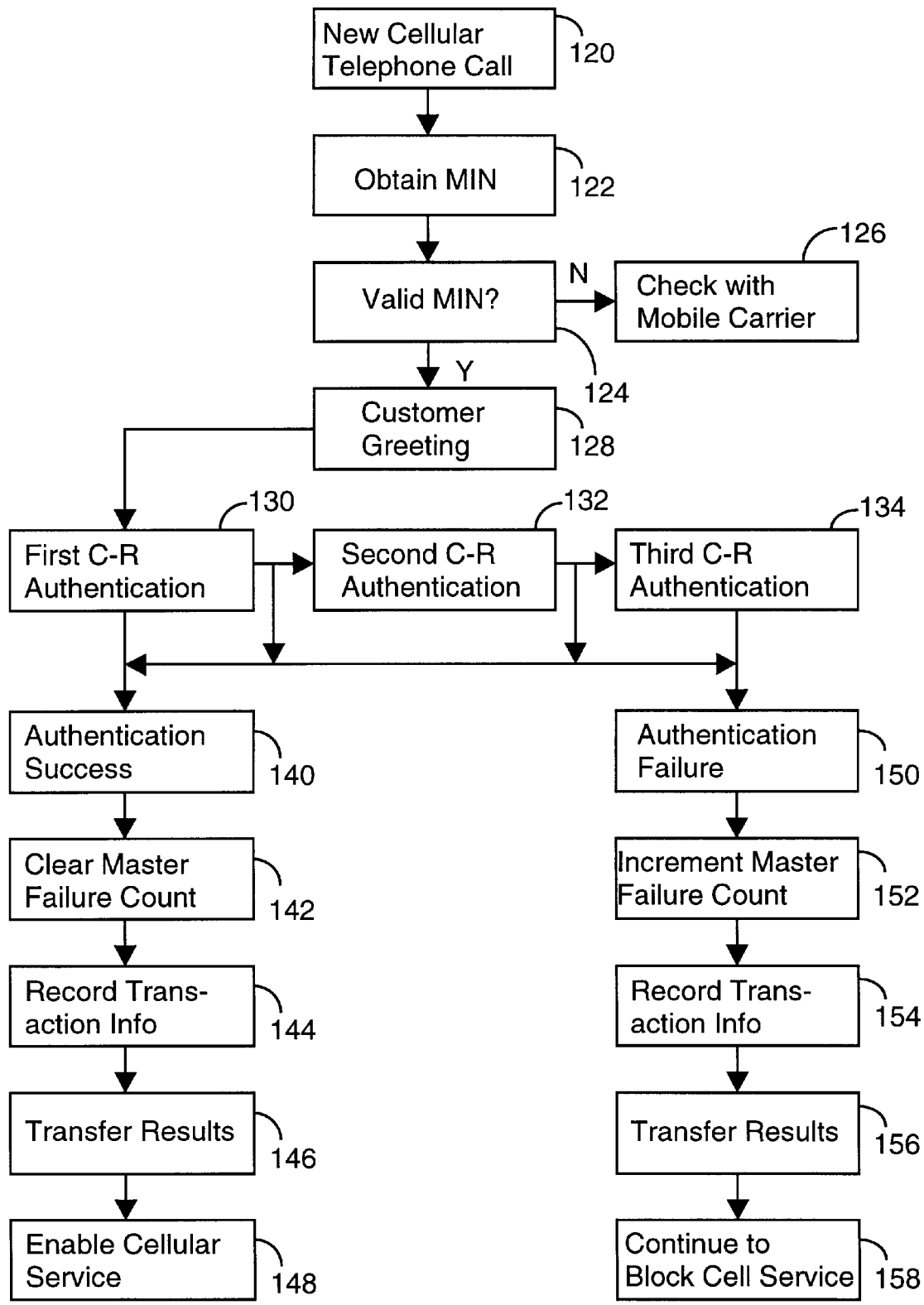
FIG. 3 is a flow diagram illustrating the processing associated with one embodiment of the invention.

The processing associated with the invention is further illuminated with reference to FIG. 3. The first processing step illustrated in FIG. 3 is the receipt of a new cellular telephone call in a roaming region (step 120). In response to the new call, a mobile identification number (MIN) or other validation number, such as an Electronic Serial Number (ESN), is obtained (step 122).

The validity of the MIN is then tested (step 124). If the MIN is not valid, then a validation failure exists. In this event, the mobile carrier should be consulted (step 126). If a valid MIN does exist, then in prior art systems, the cellular telephone call is connected. However, with the present invention, a customer greeting is executed (step 128) indicating that an authentication operation is about to be performed. The customer greeting is generated by the authentication computer 60.

The next processing step is the first challenge response authentication operation (step 130). If this processing results in an authentication success (step 140), then the master failure count variable is cleared (step 142). Thereafter, the transaction reporter is used to record information relating to the transaction (step 144). A result transferring step (step 146) is used to transfer an authentication success signal, which results in the enablement of cellular service (step 148) for a predetermined period of time.

If the first challenge-response authentication operation is not successful, then a second challenge-response authentication operation (step 132) is invoked. The second challenge response authentication operation (step 132) may include one or more rotating subscriber queries generated by a first operator. If this operation results in an authentication failure, a third challenge-response authentication operation may be invoked (step 134). This operation may include one or more rotating subscriber queries generated by a supervisory operator. The second challenge-response authentication operation (step 132) may be combined with the third challenge-response authentication operation (step 134). In either event, an authentication failure (step 150) occurs when the authentication failure count reaches a predetermined value. This causes a master failure count variable to be incremented (step 152). The master failure count variable is used to tally the number of authentication disable signals that are generated. If the variable reaches a predetermined value, future attempts at authentication may be barred altogether. For example, a processing step may be interposed between steps 124 and 128 to determine whether the master failure count has reached a specified value. If so, the telephone call can be disconnected with a message indicating that cellular telephone service will not be available for a predetermined period of time.

After the master failure count variable is incremented, transaction information is recorded (step 154) and an authentication disable signal is passed to the roaming restrictor 50, which causes the roaming mobile switching center 30 to block cellular service (step 158).

The invention has now been fully described. Attention presently turns to a consideration of alternate embodiments of the invention, implementation details of the invention, and benefits of the invention.

The invention has been described in the context of interrupting an attempted access to a random telephone number in a roaming region 28. The invention may also be used in a system wherein there is a predetermined authentication telephone number that is dialed when an individual arrives in a roaming region 28.

An individual may gain access to an operator 68 or 70 associated with the authentication computer 60 using a landline telephone 92. Because this approach is secure, is preferably used when changing subscriber information that is used for rotating subscriber queries.

It should be appreciated that the authentication computer 60 may be geographically positioned in the home region 22, the roaming region 28, or another roaming region (not shown). Similarly, the physical location of the roaming restrictor 50 is not critical. For the purpose of simplicity, FIG. 1 only illustrates one roaming region. It should be appreciated that the system typically supports a large number of roaming regions that are not shown.

In the typical system supporting a large number of roaming regions, preferably a system subscriber can specify selected roaming regions wherein authentication is not required. That is, the roaming restrictor 50 may identify accesses to the home database register 26 by selected roaming regions that do not have to be authenticated. However, even in this configuration, the roaming restrictor 50 is preferably constructed to identify suspicious calling activity in a roaming region that does not have to be authenticated. That is, the roaming restrictor 50 still monitors accesses to the home database register 26. If the access requests to the home database register 26 are inconsistent with predetermined access request patterns, suspicious calling activity exists. In the presence of suspicious calling activity, the roaming restrictor 50 may override a pre-specified non-authentication instruction for a selected roaming region and thereafter require authentication in the manner previously described.

Preferably, the roaming restrictor 50 uses a similar technique during the cellular service enablement period following an authentication success signal. That is, even if a caller has been authenticated in a roaming region, the roaming restrictor 50 still monitors the call profile for suspicious calling activity. If suspicious calling activity exists, the cellular service enablement period is terminated.

The cellular network infrastructure 34 may use the IS-41 protocol. SS7 or X.25 protocols may be used to transport IS-41 messages throughout the cellular network infrastructure. For security reasons, communication with the authentication computer 60 is preferably achieved through the use of the public switch telephone network. The secured network 90 may be implemented as a TCP/IP network.

The transaction reporter 80 may be used to provide comprehensive reports on roaming activity and other system events. This information may be safely passed to the roaming restrictor 50 over the secured network 90. The transaction reporter 80 may also be implemented in the roaming restrictor 50.

The rotating subscriber queries need not be personal in nature. The rotating subscriber queries may include corporate information for use in corporate accounts.

The invention has been described in the context of preventing roaming cellular fraud. The invention will be primarily used in this context because the abuses are most prevalent in this context. However, it should be recognized that the challenge-response technique of the invention may also be used in a home region 22 to prevent cellular fraud within the home region 22.

The invention has been disclosed in the context of a preferable embodiment utilizing a first challenge-response authentication operation that is automated and a second challenge-response authentication operation that is operator driven. These sequences may be reversed or a completely automated or a completely operator driven challenge-response system may also be used. For example, a completely automated challenge-response system is used when the modem of a computer is generating a cellular telephone call. The roaming restrictor 50 identifies this fact and instructs the authentication computer 60 to respond accordingly. The authentication computer 60 responds by generating queries on the computer screen of the calling computer or by interacting with authentication information stored in the computer generating the call.

The invention can be used in conjunction with other fraud prevention schemes. For example, one fraud prevention scheme is known as "RF fingerprinting". In RF fingerprinting, cellular telephone service is terminated when a cellular telephone call is made from a cellular telephone generating signals that are inconsistent with the RF fingerprint for the authorized PIN/ESN. Such a system may be supplemented by using the present invention to authenticate the cellular telephone caller before the cellular telephone service is terminated. The system of the invention is also compatible with other authentication techniques. For example, in the near future, many cellular telephones will be equipped with "A-Key Cave" authentication circuitry. When the roaming restrictor 50 recognizes such a telephone, it will not force an authentication operation on it.

Those skilled in the art will recognize a number of advantages associated with the system of the present invention. Primarily, the invention provides a convenient technique for authenticating the use of a cellular telephone. Consequently, the cellular telephone industry can reduce hundreds of millions of dollars in annual losses stemming from cellular telephone fraud. Advantageously, the system can be implemented into existing telephone infrastructures. This fact is most fully appreciated with reference to FIG. 1 and its accompanying discussion. This feature of the invention exploits the existing cellular telephone infrastructure, thereby minimizing the capital expenses of the system.

It should also be noted that the system operates without changing individual cellular telephones. Thus, the system can easily accommodate a wide base of existing technology.

The authentication computer 60, secured network 90, and roaming restrictor 50 connect to an existing telephone infrastructure. The existing telephone infrastructure is owned by different entities that are not amenable to sharing information about their customers. The system of the invention operates independently of these different service providers. This independence eliminates potential conflicts between cellular service providers over the accessibility of customer information.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

I claim:

1. A method of identifying the fraudulent use of a wireless telephone, said method comprising the steps of:

initiating a communication session with a wireless telephone in a roaming region outside of a home region;

identifying that said wireless telephone is in said roaming region;

interrupting said communication session in response to said identifying step;

executing a first automated challenge-response authentication operation to generate a first authentication failure; and escalating to a second operator-based challenge-response authentication operation in response to said first authentication failure to generate a second authentication failure and thereby identify the fraudulent use of said wireless telephone;

wherein said first automated challenge-response authentication operation of said executing step and said second operator-based challenge-response authentication operation of said escalating step are each performed in accordance with rotating subscriber queries of personal subscriber information.

2. The method of claim 1 wherein said identifying step includes the step of identifying that said wireless telephone is in said roaming region with a roaming database register that identifies when information about a system subscriber is passed from a home data base register to a roaming database register.

3. The method of claim 1 wherein said executing step includes the step of executing a first challenge-response authentication operation by comparing an RF fingerprint of said wireless telephone with an identification number for said wireless telephone to generate said first authentication failure.

4. The method of claim 1 further comprising the step of terminating wireless telephone service for said wireless telephone in response to said second authentication failure.

5. The method of claim 1 further comprising the steps of:

reporting data from said executing step and said escalating step to a database; and generating reports from said data in said database.

6. The method of claim 1 further comprising the step of validating a Mobile Identification Number or Electronic Serial Number prior to said executing step.

7. The method of claim 1 further comprising the steps of:

processing a subsequent call made from said wireless telephone in said roaming region;

performing a third challenge-response authentication operation to generate an authentication success; and enabling wireless telephone service for said wireless telephone in said roaming region in response to said authentication success.

8. The method of claim 7 wherein said enabling step is performed for a predetermined period of time.

9. The method of claim 8 further comprising the step of terminating said enabling step in response to suspicious calling activity in said roaming region.

* * * * *